United States Patent
Strunk

(10) Patent No.: US 9,541,225 B2
(45) Date of Patent: Jan. 10, 2017

(54) BUSHINGS, SEALING DEVICES, TUBING, AND METHODS OF INSTALLING TUBING

(71) Applicant: Titeflex Corporation, Springfield, MA (US)

(72) Inventor: Jordan Strunk, Portland, TN (US)

(73) Assignee: Titeflex Corporation, Springfield, MA (US)

( * ) Notice: Subject to any disclaimer, the term of this patent is extended or adjusted under 35 U.S.C. 154(b) by 140 days.

(21) Appl. No.: 14/318,523

(22) Filed: Jun. 27, 2014

(65) Prior Publication Data

US 2014/0333066 A1     Nov. 13, 2014

Related U.S. Application Data

(63) Continuation of application No. PCT/US2014/035452, filed on Apr. 25, 2014.

(Continued)

(51) Int. Cl.
   *F16L 25/01* (2006.01)
   *F16L 19/00* (2006.01)
   (Continued)

(52) U.S. Cl.
   CPC ........... *F16L 19/00* (2013.01); *F16L 25/0036* (2013.01); *F16L 25/01* (2013.01); *F16L 33/01* (2013.01)

(58) Field of Classification Search
   CPC .... F16L 19/00; F16L 19/0206; F16L 25/0036; F16L 33/01
   (Continued)

(56) References Cited

U.S. PATENT DOCUMENTS

| 956,077 | A | * | 4/1910 | Greenfield | F16L 33/222 |
| | | | | | 285/222.2 |
| 959,187 | A | * | 5/1910 | Witzenmann | F16L 33/01 |
| | | | | | 285/222.1 |

(Continued)

FOREIGN PATENT DOCUMENTS

| CA | 2025252 A1 | 3/1991 |
| CA | 2002644 A1 | 5/1991 |

(Continued)

OTHER PUBLICATIONS

Notification of Transmittal of the International Search Report and the Written Opinion of the International Search Authority, or the Declaration for corresponding PCT/US201/035452 application (Aug. 25, 2014).

(Continued)

*Primary Examiner* — David E Bochna
(74) *Attorney, Agent, or Firm* — Saul Ewing LLP; Brian R. Landry, Esq.

(57) ABSTRACT

A bushing including a first annular internal rib adapted and configured to engage a corrugation valley of corrugated tubing and a second annular internal rib adapted and configured to press against a conductive layer surrounding the corrugated tubing is provided. The second annular internal protrusion has a rounded, substantially non-piercing profile. Also provided is a sealing device for connecting a length of tubing. The sealing device includes a body member defining a sleeve portion and the bushing as described herein adapted and configured to be received in the sleeve portion. Also provided is a length of tubing including: an inner tubing layer and the fitting as described herein engaged with the inner tubing layer.

18 Claims, 12 Drawing Sheets

Related U.S. Application Data

(60) Provisional application No. 61/821,644, filed on May 9, 2013.

(51) Int. Cl.
  *F16L 25/00* (2006.01)
  *F16L 33/01* (2006.01)

(58) Field of Classification Search
  USPC .......... 285/903, 222.1–222.5, 323, 324, 322
  See application file for complete search history.

(56) References Cited

U.S. PATENT DOCUMENTS

| | | | |
|---|---|---|---|
| 1,223,864 A | 4/1917 | French | |
| 1,852,921 A | 4/1932 | Dreyer | |
| 2,401,949 A | 6/1946 | Mariner | |
| 2,449,369 A | 9/1948 | Lewis et al. | |
| 2,511,896 A | 6/1950 | Bingley | |
| 2,756,496 A | 7/1956 | Holland | |
| 2,848,254 A * | 8/1958 | Millar | F16L 33/26 |
| | | | 285/222.5 |
| 3,176,064 A | 3/1965 | Browne | |
| 3,189,370 A * | 6/1965 | Marshail | F16L 33/01 |
| | | | 285/222.2 |
| 3,240,234 A | 3/1966 | Bond et al. | |
| 3,457,359 A | 7/1969 | Soucy | |
| 3,488,073 A * | 1/1970 | Wold | F16L 11/15 |
| | | | 285/388 |
| 3,507,978 A | 4/1970 | Jachimowicz | |
| 3,528,159 A | 9/1970 | Miles | |
| 3,634,606 A | 1/1972 | Iyengar | |
| 3,749,814 A | 7/1973 | Pratt | |
| 3,828,112 A | 8/1974 | Johansen et al. | |
| 3,831,636 A | 8/1974 | Bittner | |
| 3,844,587 A * | 10/1974 | Fuhrmann | F16L 23/12 |
| | | | 285/903 |
| 3,934,902 A * | 1/1976 | McNamee | F16L 25/0036 |
| | | | 285/903 |
| 4,049,904 A | 9/1977 | Hori et al. | |
| 4,063,757 A * | 12/1977 | Fuhrmann | F16L 33/01 |
| | | | 285/222.1 |
| 4,103,320 A | 7/1978 | de Putter | |
| 4,292,463 A | 9/1981 | Bow et al. | |
| 4,322,574 A | 3/1982 | Bow et al. | |
| 4,394,705 A | 7/1983 | Blachman | |
| 4,440,425 A * | 4/1984 | Pate | F16L 3/1236 |
| | | | 285/149.1 |
| 4,630,850 A * | 12/1986 | Saka | F16L 25/0036 |
| | | | 285/903 |
| 4,674,775 A * | 6/1987 | Tajima | F16L 19/0206 |
| | | | 285/903 |
| 4,675,780 A | 6/1987 | Barnes et al. | |
| 4,716,075 A | 12/1987 | Christ et al. | |
| 4,791,236 A | 12/1988 | Klein | |
| 4,801,158 A * | 1/1989 | Gomi | F16L 25/0036 |
| | | | 285/903 |
| 4,907,830 A * | 3/1990 | Sasa | F16L 25/0045 |
| | | | 285/903 |
| 4,983,449 A | 1/1991 | Nee | |
| 5,043,538 A | 8/1991 | Hughey, Jr. et al. | |
| 5,046,531 A | 9/1991 | Kanao | |
| 5,061,823 A | 10/1991 | Carroll | |
| 5,087,084 A | 2/1992 | Gehring | |
| 5,120,381 A | 6/1992 | Nee | |
| 5,127,601 A | 7/1992 | Schroeder | |
| 5,131,064 A | 7/1992 | Arroyo et al. | |
| 5,182,147 A | 1/1993 | Davis | |
| 5,194,838 A | 3/1993 | Cobo | |
| 5,222,770 A | 6/1993 | Helevirta | |
| 5,225,265 A | 7/1993 | Prandy et al. | |
| 5,237,129 A | 8/1993 | Obara | |
| 5,250,342 A | 10/1993 | Lang et al. | |
| 5,267,877 A * | 12/1993 | Scannelli | H01R 9/0521 |
| | | | 439/584 |
| 5,316,047 A | 5/1994 | Kanao | |
| 5,357,049 A | 10/1994 | Plummer, III | |
| 5,367,123 A | 11/1994 | Plummer, III et al. | |
| 5,370,921 A | 12/1994 | Cedarleaf | |
| 5,391,838 A | 2/1995 | Plummer, III | |
| 5,397,618 A | 3/1995 | Cedarleaf | |
| 5,401,334 A | 3/1995 | O'Melia et al. | |
| 5,407,236 A * | 4/1995 | Schwarz | F16L 25/0045 |
| | | | 285/903 |
| 5,413,147 A | 5/1995 | Moreiras et al. | |
| 5,417,385 A | 5/1995 | Arnold et al. | |
| 5,434,354 A | 7/1995 | Baker et al. | |
| 5,441,312 A | 8/1995 | Fujiyoshi et al. | |
| 5,470,413 A | 11/1995 | Cedarleaf | |
| 5,483,412 A | 1/1996 | Albino et al. | |
| 5,485,870 A | 1/1996 | Kraik | |
| 5,531,841 A | 7/1996 | O'Melia et al. | |
| 5,553,896 A | 9/1996 | Woodward | |
| 5,571,992 A | 11/1996 | Maleski et al. | |
| 5,619,015 A | 4/1997 | Kirma | |
| 5,634,827 A | 6/1997 | Francois et al. | |
| 5,655,572 A | 8/1997 | Marena | |
| 5,671,780 A | 9/1997 | Kertesz | |
| 5,702,994 A | 12/1997 | Klosel | |
| 5,716,193 A | 2/1998 | Mondet et al. | |
| 5,738,385 A * | 4/1998 | Homann | F16L 21/04 |
| | | | 285/903 |
| 5,974,649 A | 11/1999 | Marena | |
| 6,003,561 A | 12/1999 | Brindza et al. | |
| 6,006,788 A | 12/1999 | Jung et al. | |
| 6,036,237 A | 3/2000 | Sweeney | |
| 6,039,084 A | 3/2000 | Martucci et al. | |
| 6,170,533 B1 | 1/2001 | He | |
| 6,173,995 B1 * | 1/2001 | Mau | F16L 25/0036 |
| | | | 285/903 |
| 6,201,183 B1 | 3/2001 | Eribom et al. | |
| 6,235,385 B1 | 5/2001 | Lee | |
| 6,279,615 B1 | 8/2001 | Iio et al. | |
| 6,293,311 B1 | 9/2001 | Bushi et al. | |
| 6,310,284 B1 | 10/2001 | Ikeda | |
| 6,315,004 B1 | 11/2001 | Wellman et al. | |
| 6,349,774 B2 | 2/2002 | Alhamad | |
| 6,409,225 B1 | 6/2002 | Ito | |
| 6,435,567 B2 * | 8/2002 | Kikumori | F16L 25/0036 |
| | | | 285/903 |
| 6,441,308 B1 | 8/2002 | Gagnon | |
| 6,561,229 B2 | 5/2003 | Wellman et al. | |
| 6,563,045 B2 | 5/2003 | Goett et al. | |
| 6,631,741 B2 | 10/2003 | Katayama et al. | |
| 6,657,126 B2 | 12/2003 | Ide et al. | |
| 6,671,162 B1 | 12/2003 | Crouse | |
| 6,689,281 B2 | 2/2004 | Ikeda | |
| 6,689,440 B2 | 2/2004 | Hsich et al. | |
| 6,732,765 B2 | 5/2004 | Schippl et al. | |
| 6,840,803 B2 | 1/2005 | Wlos et al. | |
| 6,959,735 B2 | 11/2005 | Seyler et al. | |
| 6,966,344 B2 | 11/2005 | Coutarel et al. | |
| 7,021,673 B2 | 4/2006 | Furuta et al. | |
| 7,040,351 B2 | 5/2006 | Buck et al. | |
| 7,044,167 B2 | 5/2006 | Rivest | |
| 7,052,751 B2 | 5/2006 | Smith et al. | |
| 7,069,956 B1 | 7/2006 | Mosier | |
| 7,104,285 B2 | 9/2006 | Furuta | |
| 7,114,526 B2 | 10/2006 | Takagi et al. | |
| 7,223,312 B2 | 5/2007 | Vargo et al. | |
| 7,276,664 B2 | 10/2007 | Gagnon | |
| 7,308,911 B2 | 12/2007 | Wilkinson | |
| 7,316,548 B2 | 1/2008 | Jager | |
| 7,328,725 B2 | 2/2008 | Henry et al. | |
| 7,367,364 B2 | 5/2008 | Rivest et al. | |
| 7,390,027 B2 | 6/2008 | Kiely | |
| 7,410,550 B2 | 8/2008 | Sherwin | |
| 7,493,918 B2 | 2/2009 | Thomson | |
| 7,516,762 B2 | 4/2009 | Colbachini | |
| 7,562,448 B2 | 7/2009 | Goodson | |
| 7,607,700 B2 * | 10/2009 | Duquette | F16L 19/041 |
| | | | 285/903 |

(56) References Cited

U.S. PATENT DOCUMENTS

| | | | |
|---|---|---|---|
| 7,621,567 B2 | 11/2009 | Duquette et al. | |
| 7,677,609 B2 * | 3/2010 | Treichel | F16L 19/065 |
| | | | 285/322 |
| 8,399,767 B2 * | 3/2013 | Duquette | F16L 9/147 |
| | | | 174/650 |
| 8,485,562 B2 * | 7/2013 | Zerrer | F16L 25/0036 |
| | | | 285/903 |
| 8,766,110 B2 * | 7/2014 | Daughtry | H02G 3/0691 |
| | | | 285/334.5 |
| 2001/0001986 A1 | 5/2001 | Alhamad | |
| 2001/0030054 A1 | 10/2001 | Goett et al. | |
| 2002/0007860 A1 | 1/2002 | Katayama et al. | |
| 2002/0017333 A1 | 2/2002 | Wellman et al. | |
| 2002/0053448 A1 | 5/2002 | Ikeda | |
| 2002/0081921 A1 | 6/2002 | Vargo et al. | |
| 2002/0163415 A1 | 11/2002 | Ide et al. | |
| 2002/0174906 A1 | 11/2002 | Katayama et al. | |
| 2003/0012907 A1 | 1/2003 | Hsich et al. | |
| 2003/0019655 A1 | 1/2003 | Gagnon | |
| 2003/0085049 A1 | 5/2003 | Nugent | |
| 2003/0127147 A1 | 7/2003 | Van Dam et al. | |
| 2004/0020546 A1 | 2/2004 | Furuta | |
| 2004/0028861 A1 | 2/2004 | Smith et al. | |
| 2004/0060610 A1 | 4/2004 | Espinasse | |
| 2004/0090065 A1 | 5/2004 | Furuta et al. | |
| 2004/0112454 A1 | 6/2004 | Takagi | |
| 2004/0129330 A1 | 7/2004 | Seyler et al. | |
| 2004/0155463 A1 | 8/2004 | Moner | |
| 2004/0182463 A1 | 9/2004 | Bessette et al. | |
| 2004/0200537 A1 | 10/2004 | Rivest | |
| 2004/0200538 A1 | 10/2004 | Dalmolen | |
| 2004/0227343 A1 | 11/2004 | Takagi et al. | |
| 2004/0261877 A1 | 12/2004 | Buck et al. | |
| 2005/0023832 A1 | 2/2005 | Edler | |
| 2005/0067034 A1 | 3/2005 | Thomson | |
| 2005/0115623 A1 | 6/2005 | Coutarel et al. | |
| 2005/0126651 A1 | 6/2005 | Sherwin | |
| 2005/0150596 A1 | 7/2005 | Vargo et al. | |
| 2005/0181203 A1 | 8/2005 | Rawlings et al. | |
| 2005/0211325 A1 | 9/2005 | Takagi et al. | |
| 2005/0211326 A1 | 9/2005 | Hibino et al. | |
| 2005/0229991 A1 | 10/2005 | Hardy et al. | |
| 2006/0006651 A1 * | 1/2006 | Watanabe | F16L 25/0036 |
| | | | 285/903 |
| 2006/0042711 A1 | 3/2006 | Hibino et al. | |
| 2006/0051592 A1 | 3/2006 | Rawlings et al. | |
| 2006/0143920 A1 | 7/2006 | Morrison et al. | |
| 2006/0144456 A1 | 7/2006 | Donnisori et al. | |
| 2006/0254662 A1 | 11/2006 | Rivest et al. | |
| 2007/0012472 A1 | 1/2007 | Goodson | |
| 2007/0018450 A1 | 1/2007 | Golafshani | |
| 2007/0034275 A1 | 2/2007 | Henry et al. | |
| 2007/0063510 A1 | 3/2007 | Gronquist | |
| 2007/0193642 A1 | 8/2007 | Werner et al. | |
| 2007/0273148 A1 | 11/2007 | Duquette et al. | |
| 2007/0273149 A1 | 11/2007 | Duquette et al. | |
| 2007/0281122 A1 | 12/2007 | Blanchard et al. | |
| 2008/0017265 A1 | 1/2008 | Colbachini | |
| 2008/0131609 A1 | 6/2008 | Vargo et al. | |
| 2008/0169643 A1 | 7/2008 | Marban et al. | |
| 2008/0210329 A1 | 9/2008 | Quigley et al. | |
| 2008/0236695 A1 | 10/2008 | Takagi | |
| 2008/0245434 A1 | 10/2008 | Hibino et al. | |
| 2009/0084459 A1 | 4/2009 | Williams | |
| 2009/0114304 A1 | 5/2009 | Mohri | |
| 2010/0090459 A1 | 4/2010 | Duquette et al. | |
| 2010/0181760 A1 | 7/2010 | Duquette et al. | |
| 2010/0201124 A1 | 8/2010 | Duquette et al. | |
| 2011/0041944 A1 | 2/2011 | Duquette et al. | |
| 2011/0042139 A1 | 2/2011 | Duquette et al. | |
| 2013/0087381 A1 | 4/2013 | Daughtry et al. | |

FOREIGN PATENT DOCUMENTS

| | | |
|---|---|---|
| CA | 2061365 A1 | 8/1992 |
| CA | 2100241 A1 | 10/1992 |
| CA | 2084626 A1 | 6/1993 |
| CA | 2162985 A1 | 6/1996 |
| CA | 2206609 A1 | 12/1997 |
| CA | 2263462 A1 | 3/1998 |
| CA | 2245738 A1 | 6/1998 |
| CA | 2422643 A1 | 3/2002 |
| CA | 2520276 A1 | 10/2004 |
| CA | 2538808 A1 | 4/2005 |
| CA | 2618866 A1 | 2/2007 |
| CA | 2651829 A1 | 11/2007 |
| CA | 2590121 A1 | 1/2008 |
| CA | 2621046 A1 | 8/2008 |
| DE | 9116565 U1 | 1/1993 |
| EP | 1180631 A2 | 2/2002 |
| EP | 1313190 A1 | 5/2003 |
| GB | 650082 | 2/1951 |
| GB | 650082 A | 2/1951 |
| GB | 1181765 A | 2/1970 |
| GB | 1201722 A | 8/1970 |
| GB | 1353452 A | 5/1974 |
| GB | 2197409 A | 5/1988 |
| GB | 2424935 A | 10/2006 |
| JP | 2002174374 A | 6/2002 |
| JP | 2002286175 A | 10/2002 |
| JP | 2002310381 A | 10/2002 |
| JP | 2002315170 A | 10/2002 |
| JP | 2003056760 A | 2/2003 |
| JP | 2003083482 A | 3/2003 |
| JP | 2003083483 A | 3/2003 |
| WO | 9816770 A1 | 4/1998 |
| WO | 02087869 A2 | 11/2002 |
| WO | 2005059424 A1 | 6/2005 |
| WO | 2007042832 A1 | 4/2007 |
| WO | 2008/116041 A2 | 9/2008 |
| WO | 2008118944 A2 | 10/2008 |
| WO | 2008/150449 A1 | 12/2008 |
| WO | 2008/150469 A1 | 12/2008 |
| WO | 2011022124 A1 | 2/2011 |

OTHER PUBLICATIONS

Dexmet Corporation, "Applications," <http://www.dexmet.com/Expanded-Metal/applications.html> (May 18, 2009).

Dexmet Corporation, "EMI/RFI shielding & ESD Shielding with expanded metal," <http://www.dexmet.com/Expanded- Metal/shielding.html> (May 18, 2009).

Dexmet Corporation, "Product Range," <http://www.dexmet.com/Expanded-Metal/metal-foil-product-range.html> (Jul. 13, 2009).

OmegaFlex, "Lightning Safety Recommendations for Gas Piping Systems" (2008).

Parmley, "Machine Devices and Componants," Illustrated Sourcebook, p. 20-5 (2005).

Guard-Nut Inc., "Shear-Type System" http://www.guardnut.com/torque_limiting.html, (Sep. 29, 2011).

First Office Action, Chinese Patent Application No. 2014800261211 (Jul. 13, 2016).

Communication, European Patent Application No. 14794182.7, Nov. 24, 2016.

* cited by examiner

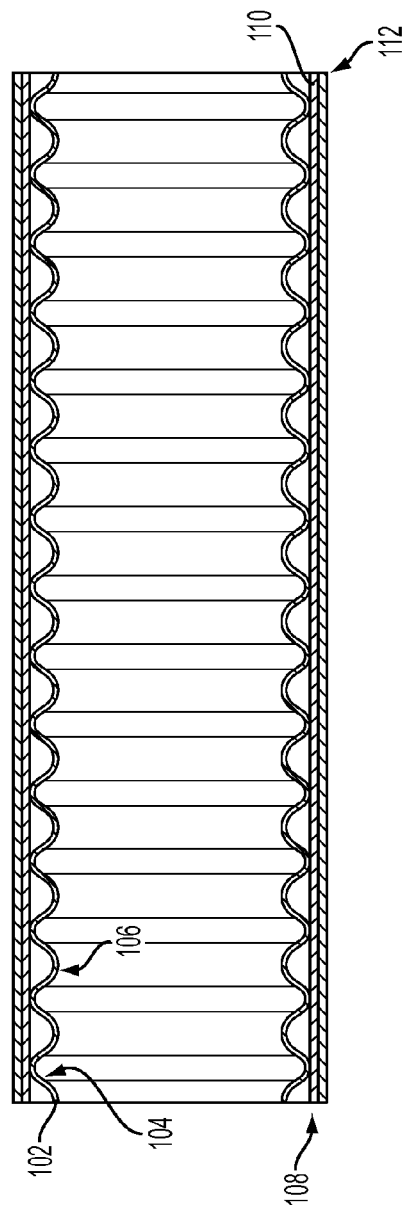
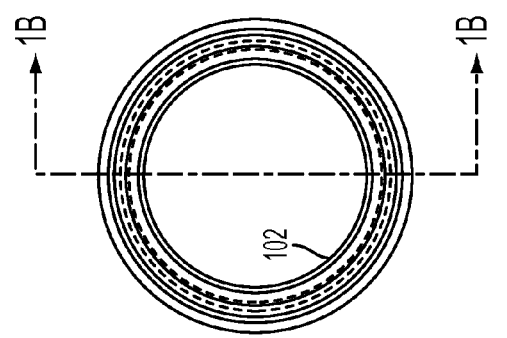

BUSHINGS, SEALING DEVICES, TUBING, AND METHODS OF INSTALLING TUBING

CROSS-REFERENCE TO RELATED APPLICATION

This patent application is a continuation under 35 U.S.C. §120 of International Application No. PCT/US2014/035452 filed Apr. 25, 2014 which claims priority to U.S. Provisional Patent Application Ser. No. 61/821,644, filed May 9, 2013. The entire content of each application is hereby incorporated by reference herein.

FIELD OF INVENTION

The present invention relates to gas, liquid, and slurry piping systems as well as protective conduit systems for cable carrying purposes, and more particularly to bushings, sealing devices, tubing, methods of installing tubing incorporating fittings capable of transferring and dissipating energy.

BACKGROUND OF THE INVENTION

Gas and liquid piping systems utilizing corrugated stainless steel tubing ("CSST") and fittings are known. Such piping systems can be designed for use in combination with elevated pressures of up to about 25 psi or more and provide advantages over traditional rigid black iron piping systems in terms of ease and speed of installation, elimination of onsite measuring, and reduction in the need for certain fittings such as elbows, tees, and couplings Often, electrical currents will occur inside a structure. These electrical currents, which can vary in duration and magnitude, can be the result of power fault currents or induced currents resulting from lightning interactions with a house or structure. The term "fault current" is typically used to describe an overload in an electrical system, but is used broadly herein to include any electrical current that is not normal in a specific system. These currents can be the result of any number of situations or events such as a lightning event. Electrical currents from lightning can reach a structure directly or indirectly. Direct currents result from lightning that attaches to the actual structure or a system contained within the structure. When current from a nearby lightning stroke moves through the ground or other conductors into a structure, it is referred to as indirect current. While both direct and indirect currents may enter a structure through a particular system, voltage can be induced in other systems in the structure, especially those in close proximity to piping systems. This can often result in an electrical flashover or arc between the adjacent systems. A flashover occurs when a large voltage differential exists between two electrical conductors, causing the air to ionize, the material between the conductive bodies to be punctured by the high voltage, and formation of a spark.

SUMMARY OF THE INVENTION

One aspect of the invention provides a bushing including a first annular internal rib adapted and configured to engage a corrugation valley of corrugated tubing and a second annular internal rib adapted and configured to press against a conductive layer surrounding the corrugated tubing. The second annular internal protrusion has a rounded, substantially non-piercing profile.

This aspect of the invention can have a variety of embodiments. In one embodiment, the second annular internal rib can be spaced along the bushing such that the second annular internal rib aligns with other corrugation grooves of the corrugated tubing.

The bushing can include a third annular internal rib adapted and configured to press against an external jacket surrounding the conductive layer. The third annular internal rib can be spaced along the bushing such that the third annular internal rib aligns with other corrugation grooves of the corrugated tubing.

The bushing can be a split bushing. The bushing can be a two-piece bushing. The bushing can include two halves coupled by a living hinge.

The bushing can be fabricated from a conductive material. The conductive material can be a metal. The metal can be selected from the group consisting of: aluminum, copper, gold, iron, silver, zinc, and an alloy thereof. The alloy can be selected from the group consisting of brass, bronze, steel, and stainless steel.

Another aspect of the invention provides a sealing device for connecting a length of tubing. The sealing device includes a body member defining a sleeve portion and the bushing as described herein adapted and configured to be received in the sleeve portion.

This aspect of the invention can have a variety of embodiments. The sealing device can include a nut adapted and configured for threaded coupling with the body member. The bushing and the nut can be dimensioned such that as the nut is tightened, the second annular internal protrusion is compressed against the conductive layer by the nut.

Another aspect of the invention provides a length of tubing including: an inner tubing layer and the fitting as described herein engaged with the inner tubing layer.

This aspect of the invention can have a variety of embodiments. The inner tubing layer can be corrugated. The inner tubing layer can be corrugated stainless steel tubing.

Another aspect of the invention provides a method of installing energy dissipative tubing. The method includes: providing a length of tubing including an inner tubing layer; providing a sealing device as described herein; placing the bushing over at least the inner tubing layer such that the first annular rib engages a corrugation groove; and inserting the bushing and at least the inner tubing layer into the sleeve portion.

Another aspect of the invention provides a bushing including: a first annular internal rib adapted and configured to engage a corrugation valley of corrugated tubing; a second annular internal rib adapted and configured to press against a conductive layer surrounding the corrugated tubing, wherein the second annular internal protrusion has a rounded, non-piercing profile; and a third annular internal rib adapted and configured to press against an outer jacket layer surrounding the conductive layer. The second annular internal rib and the third internal rib are spaced along the bushing such that the second annular internal rib and the third internal rib each align with other corrugation grooves of the corrugated tubing.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views and wherein:

FIGS. 1A and 1B depict a multi-layer jacketed tube in accordance with the prior art;

DEFINITIONS

Figure 2B:
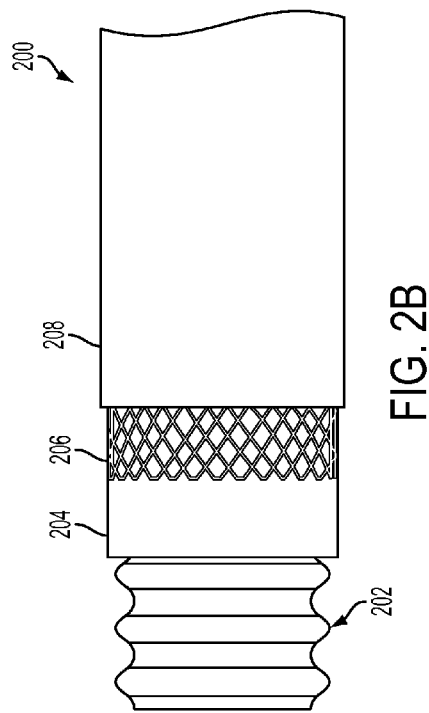
FIGS. 2A-2D depict an energy dissipative tube in accordance with the prior art.
Figure 2D:
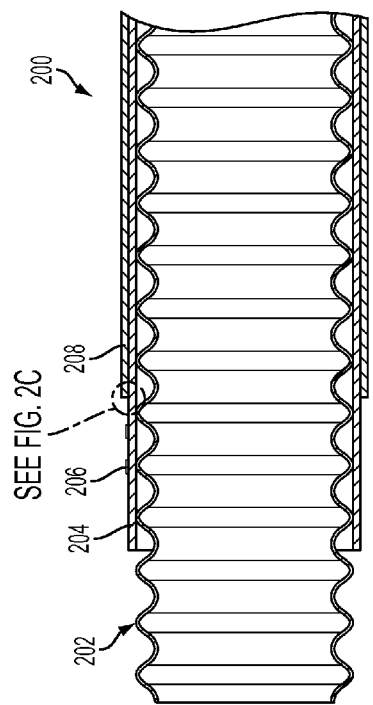
Figure 2A:
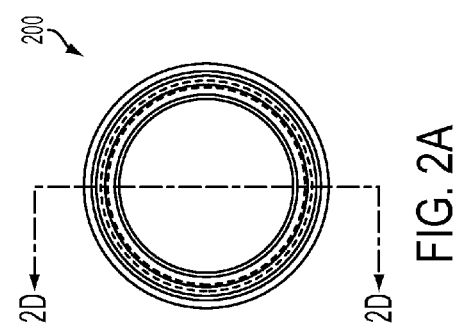
Figure 2C:
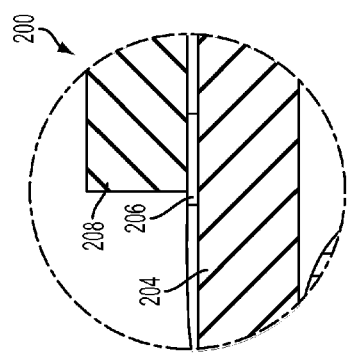

The instant invention is most clearly understood with reference to the following definitions:

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used herein, the term "alloy" refers to a homogenous mixture or metallic solid solution composed of two or more elements. Examples of alloys include austenitic nickel-chromium-based superalloys, brass, bronze, steel, low carbon steel, phosphor bronze, stainless steel, and the like.

As used in the specification and claims, the terms "comprises," "comprising," "containing," "having," and the like can have the meaning ascribed to them in U.S. patent law and can mean "includes," "including," and the like.

As used herein, the terms "corrugated stainless steel tubing" and "CSST" refer to any type of semi-flexible tubing or piping that can accommodate corrosive or aggressive gases or liquids. In some embodiments, CSST is designed and/or approved for conveyance of fuel gases such as natural gas, methane, propane, and the like. For example, CSST can comply with a standard such as the ANSI LC 1-2005/CSA 6.26-2005 Standard for Fuel Gas Piping Systems Using Corrugated Stainless Steel Tubing. The inventions described herein can be utilized in conjunction with all commercially available CSST products including, but not limited to CSST sold under the GASTITE® and FLASHSHIELD® brands by Titeflex Corporation of Portland, Tenn.; TRACPIPE® and COUNTERSTRIKE® brands by OmegaFlex, Inc. of Exton, Pa.; WARDFLEX® brand by Ward Manufacturing of Blossburg, Pa.; PRO-FLEX® by Tru-Flex Metal Hose Corp. of Hillsboro, Ind.; and DIAMONDBACK™ brand by Metal Fab, Inc. of Wichita, Kans.

Unless specifically stated or obvious from context, the term "or," as used herein, is understood to be inclusive.

As used herein, the term "metal" refers to any chemical element that is a good conductor of electricity and/or heat. Examples of metals include, but are not limited to, aluminum, cadmium, niobium (also known as "columbium"), copper, gold, iron, nickel, platinum, silver, tantalum, titanium, zinc, zirconium, and the like.

As used herein, the term "resin" refers to any synthetic or naturally occurring polymer. Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

Corrugated Tubing

Referring to FIGS. 1A and 1B, a length of corrugated tubing 102 according to the prior art is provided. The corrugated tubing 102 may be composed of stainless steel or any other suitable material. The tubing 102 contains a number of corrugation peaks 104 and corrugation valleys 106. A jacket 108 (e.g., a multi-layer jacket) covers the outside of the tubing 102.

The jacket 108 can include a plurality of layers 110, 112. The layers 110, 112 generally form an annulus around the tubing 102, but may have a circular or non-circular cross-section.

Energy Dissipative Tubing

Referring now to FIGS. 2A-2D, in order to better absorb energy from fault currents and lightning strikes, energy dissipative jackets are provided that dissipate electrical and thermal energy throughout the respective jackets, thereby protecting the tubing 202. The term "dissipate" encompasses distributing electrical energy to an appropriate grounding device such as a fitting.

Preferred embodiments of energy dissipative jackets preferably include one or more conductive layers for distributing electricity and heat. The conductive layers can include, for example, conductive resins and/or metals as discussed herein.

One embodiment of energy dissipative tubing 200 is depicted in FIGS. 2A-2D. The energy dissipative tubing 200 includes a length of tubing 202. The tubing 202 can be metal tubing, thin-walled metal tubing, corrugated tubing, corrugated stainless steel tubing, or the like.

Tubing 202 is surrounded by a first resin layer 204, a metal layer 206, and a second resin layer 208. Resin layers 204, 208 can be formed from insulative and/or conductive resins.

Insulating resin layers can be formed from a variety of materials. In some embodiments, an insulating elastic layer includes polytetrafluoroethylene (PTFE). Other suitable insulators include polyolefin compounds, thermoplastic polymers, thermoset polymers, polymer compounds, polyethylene, crosslinked polyethylene, UV-resistant polyethylene, ethylene-propylene rubber, silicone rubber, polyvinyl chloride (PVC), ethylene tetrafluoroethylene (ETFE), and ethylene propylene diene monomer (EPDM) rubber.

Conductive resin layers can be formed by impregnating a resin with conductive material such as metal particles (e.g., copper, aluminum, gold, silver, nickel, and the like), carbon black, carbon fibers, or other conductive additives. In some embodiments, the metal layer 206 and/or one or more of the resin layers 204, 208 has a higher electrical conductivity than the tubing 202. In some embodiments, the volume resistivity of the conductive resin can be less than about $10^6$ ohm-cm (e.g., $9 \times 10^6$ ohm-cm) as tested in accordance with ASTM standard D4496.

In some embodiments, each resin layer 204, 208 has a thickness of about 0.015 to about 0.035.

Metal layer 206 can include one or more metals (e.g., ductile metals) and alloys thereof. The metal(s) can be formed into foils, perforated foils, tapes, perforated tapes, cables, wires, strands, meshes, braids, and the like.

In some embodiments, the metal layer 206 is an expanded metal foil as further described in U.S. Patent Application Publication No. 2011-0041944. A variety of expanded metal foils are available from the Dexmet Corporation of Wallingford, Conn. An exemplary embodiment of energy dissipative tubing 200 with expanded metal foil is depicted in FIG. 2.

In some embodiments, the metal layer 206 completely surrounds the first resin layer 204. In such embodiments, the metal may overlap and/or be welded or soldered in some regions. In other embodiments, the metal layer 206 substantially surrounds the first resin layer 204. In such embodiments, a small portion of the first resin layer 204 (e.g., less than about 1°, less than about 2°, less than about 3°, less than about 4°, less than about 5°, less than about 10°, less than about 15°, less than about 20°, and the like) is not surrounded by the metal layer 26. In still other embodiments, the metal layer 206 can be wrapped spirally or helically around the first resin layer 204. In such an embodiment, the metal layer 206 can overlap or substantially surround the first resin layer 204

In some embodiments, the metal layer 206 is a conventional, non-expanded metal foil, such as aluminum or copper foil that can, in some embodiments, completely envelop the inner resin layer 206.

Various thicknesses of the resin layers 204, 208 and the metal layer 206 can be selected to achieve desired resistance to lightning strikes and physical damage while maintaining desired levels of flexibility. In embodiments including an expanded metal foil, the mass per area can be adjusted to provide an appropriate amount of energy dissipation. The resin layers 204, 208 can be the same or different thickness and can include the same or different materials. Various colors or markings can be added to resin layers, for example, to clearly distinguish the resin layers 204, 208 from each other and from the metal layer 206 and/or to make the tubing 200 more conspicuous.

Sealing Devices

Figure 3A:
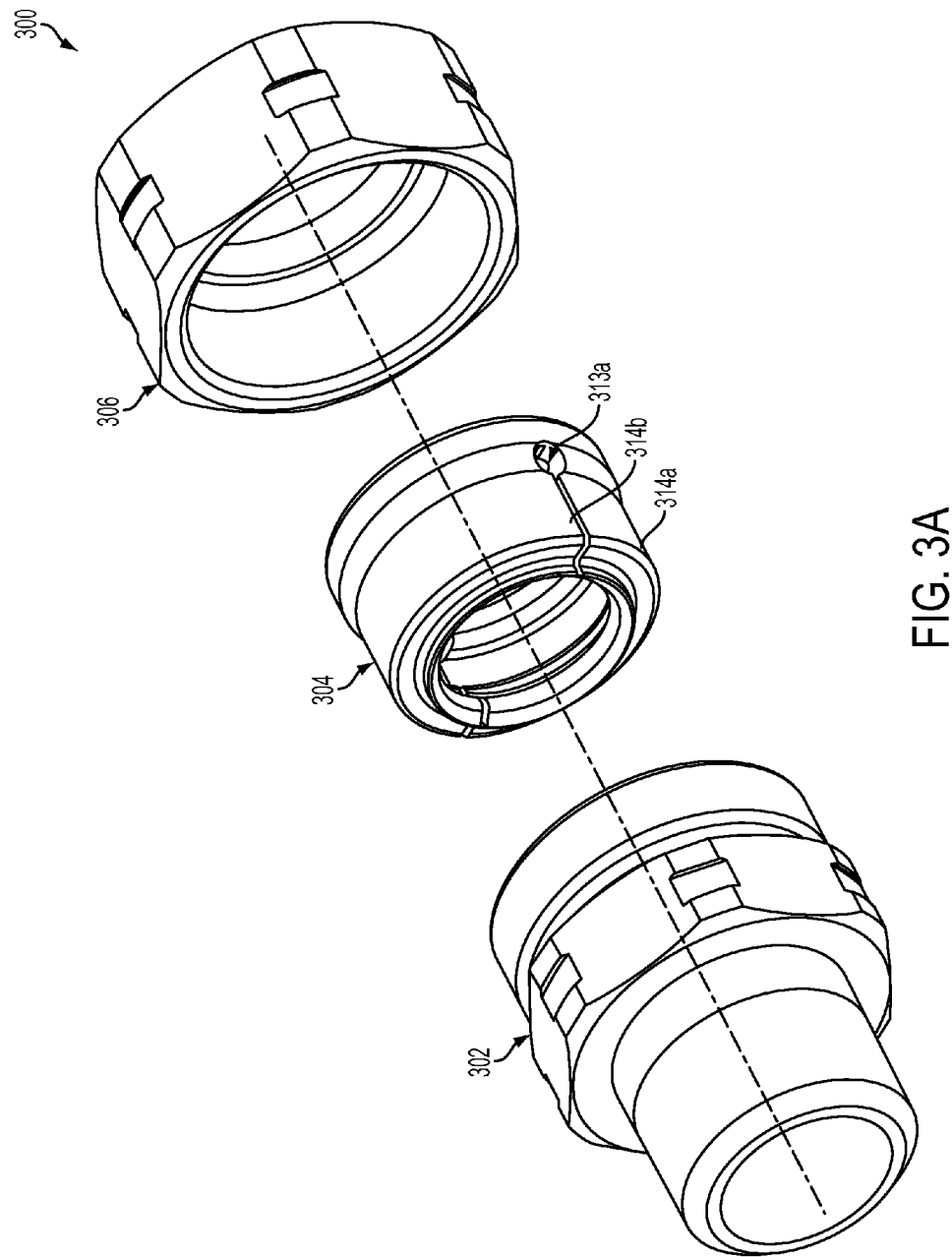
FIGS. 3A-3E depict embodiments of a sealing device and tubing assembly in accordance with preferred embodiments of the invention.
Figure 3B:
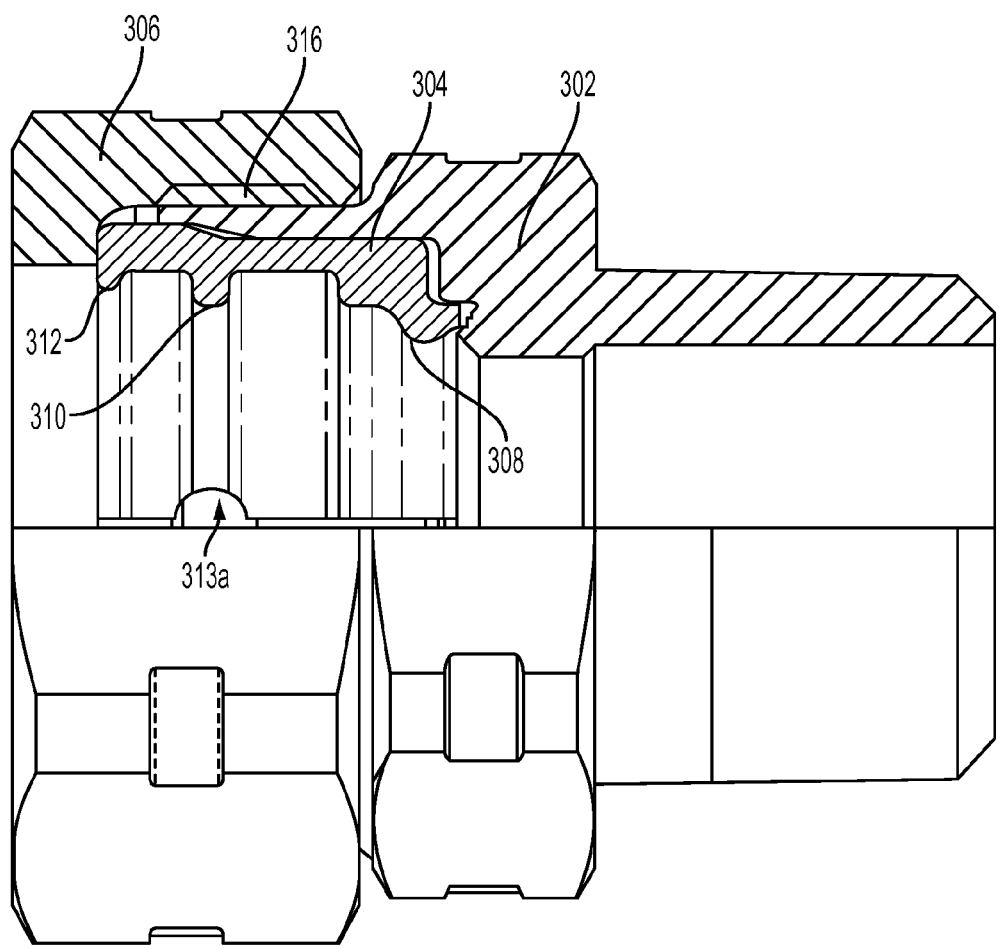
Figure 3C:
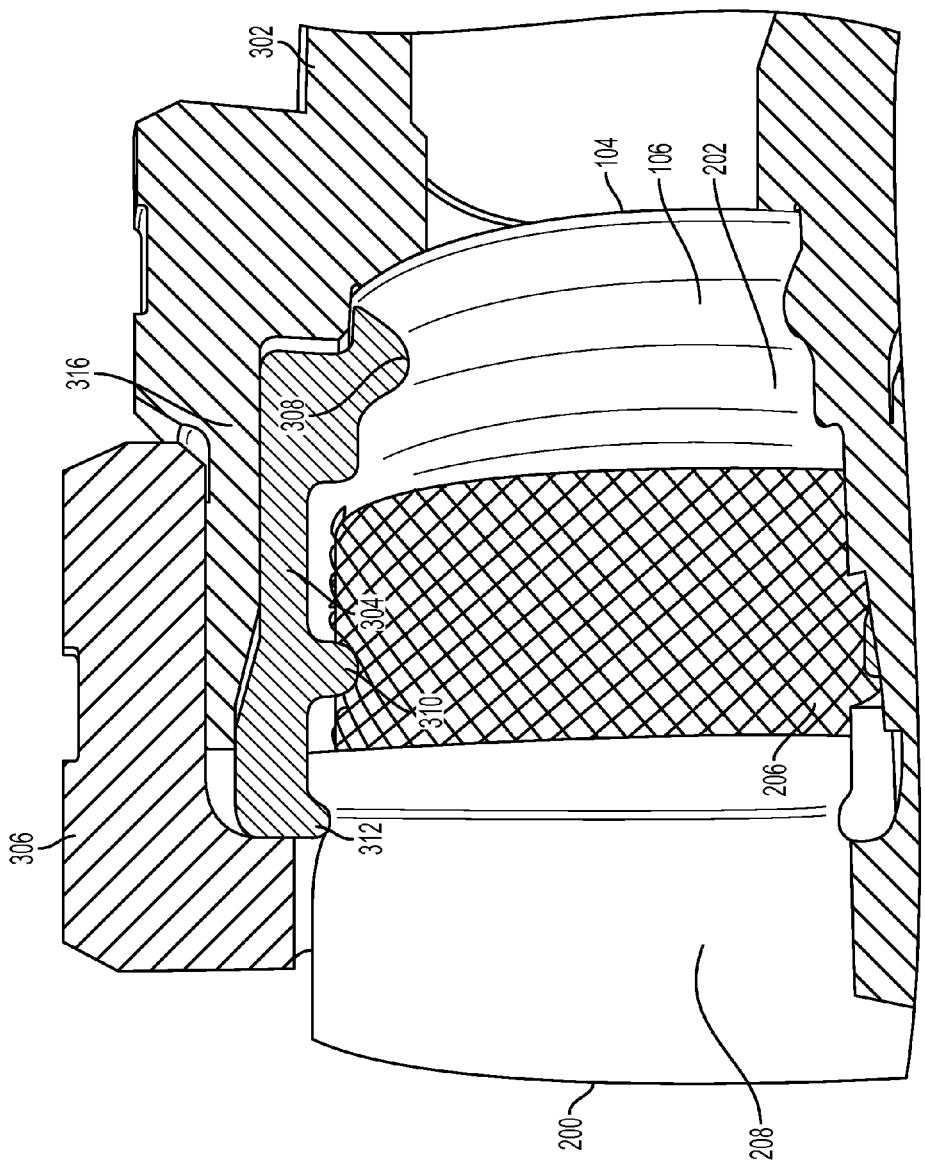

Referring now to FIG. 3A, an exploded view of a sealing device 300 is provided. The sealing device 300 allows for the sealing and coupling of an end of tubing (not depicted) to a pipe, a manifold, an appliance, and the like (not depicted). For example, after body member 302 is threaded onto a manifold (not depicted), tubing 200 and bushing 304 can be placed inside the a sleeve portion of the body member 302 and sealed by advancing a nut 306 as further discussed below.

Nut 306 can have internal or external threads to mate with body member 302. In some embodiments, nut 306 can include a torque-limiting feature as described in U.S. Patent Application Publication No. 2013-0087381.

Although the assembly 300 can be used with a variety of types of CSST, the bushing 304 is particularly advantageous when used with energy dissipative tubing having one or more conductive layers.

Referring now to FIGS. 3B-3E, partial cross-sections of the assembly 300 are provided to show the internal structure of bushing 304. Bushing 304 includes a first annular rib 308 adapted and configured to engage with corrugation valley 106 of the corrugated tubing 202.

In one embodiment, the first annular rib 308 engages the first corrugation valley 106 of the tubing to facilitate the sealing of the tubing 202 against the body member 302. As the nut 306 is advanced, the first annular rib 308 of the bushing 304 presses the tubing 202 against the sealing face of the body member 302, causing the first corrugation peak 104 to collapse and form a gastight seal.

Body member 302 can include a sealing face having one or more sealing circular ridges adapted and configured to facilitate a metal-to-metal gastight seal. Such a sealing architecture is described in U.S. Pat. Nos. 7,607,700 and 7,621,567 and embodied in the XR2 fitting available from Gastite of Portland, Tenn.

Bushing 304 also includes a second annular rib 310. Second annular rib 310 is adapted and configured to press against and form electrical continuity with conductive layer 206 so that any electricity received in the conductive layer 206 will flow through the second annular rib 310 and bushing 304. In order to facilitate as large of a contact area as possible between the conductive layer 206 and the second annular rib 310, second annular rib 310 has a rounded, substantially non-piercing profile.

Preferably, second annular rib 310 is positioned along bushing 304 with respect to the first annular rib 308 such that when the first annular rib 308 engages with a corrugation valley 106, the second annular rib 310 will also be positioned over another corrugation valley 106 so that the second annular rib 310 can press the conductive layer 206 (and any layers 204 below) into the corrugation valley 106 and create further contact between the second annular rib 310 and the conductive layer 206.

Figure 3D:
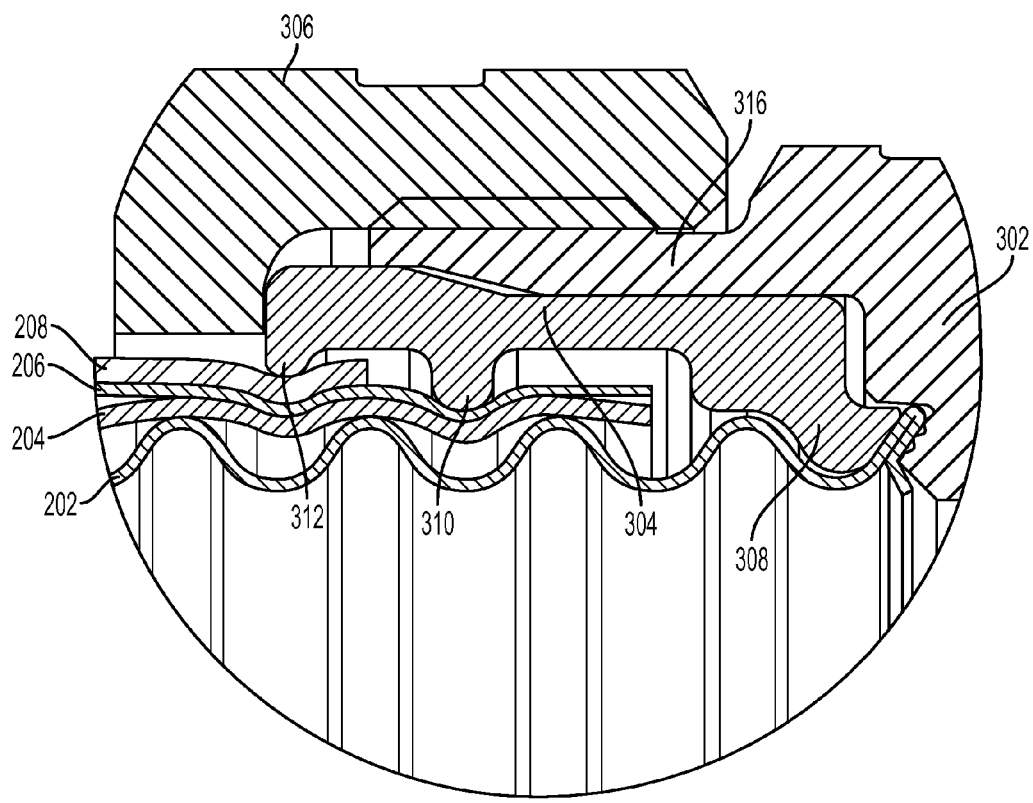
Figure 3E:
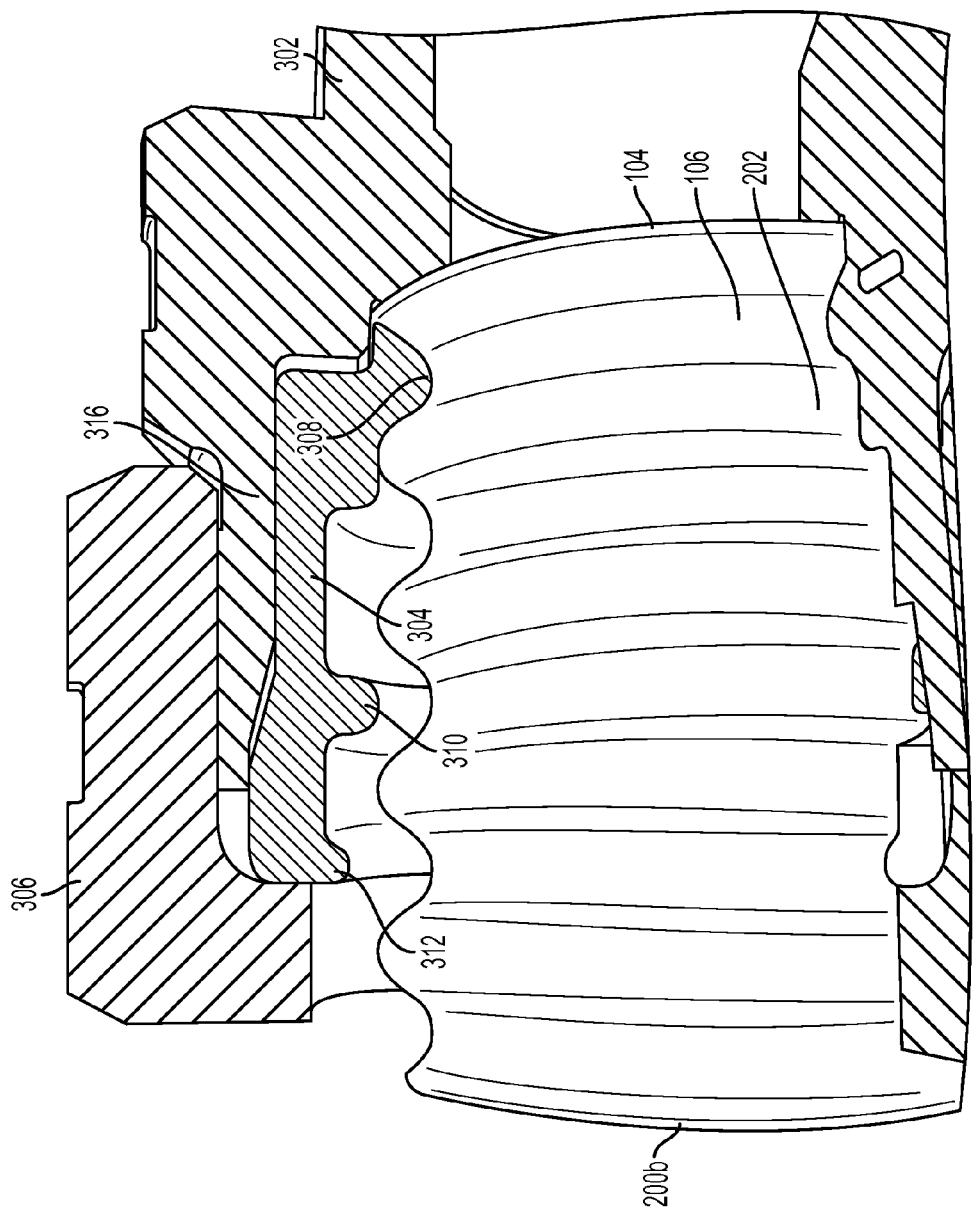

Preferably, second annular rib 310 can be located over the third corrugation valley 106 of the tubing (as seen in FIG. 3D), but may also be located at the second or fourth corrugation valley 106. Locating second annular rib 310 over a corrugation valley 106 is favorable so as to prevent any direct contact with layers 204 or 206 and the corrugated tubing 202 beneath when the bushing 304 is assembled onto the tubing. Direct contact between these layers 204, 206 and the tubing 202 due to the compression from bushing 304 may result in undesired mechanical interference that leads to difficult assembly or decreased performance or longevity.

In order to maximize the contact area and steadfastness of the connection between the second annular rib 310 and the conductive layer 206, the second annular rib 310 can be designed to have certain dimensions relative to dimensions of tubing 200.

Generally, the internal diameter of the second annular rib 310 will often be less than the outer diameter of the conductive layer 206 so that the second annular rib 310 presses into and deforms conductive layer 206 and any layers 204 below. Although the difference between diameters may vary across various tubing sizes, the difference between the outer diameter of the conductive layer 206 and the inner diameter of the second annular rib 310 can be between about 0% and about 1%, between about 1% and about 2%, between about 2% and about 3%, between about 3% and about 4%, between about 4% and about 5%, between about 5% and about 6%, between about 6% and about 7%, between about 7% and about 8%, between about 8% and about 9%, between about 9% and about 10%, and the like In one embodiment, the cross-sectional radius of second annular rib 310 can be about 0.030". Such a sizing can advantageously apply both to fittings 300 for ½" CSST as well as to larger diameter CSST such as ¾", 1", 1¼", 1½", 2" and the like. In some embodiments, the radius may be larger to more closely approximate the larger corrugation valleys 106 on larger diameter tubing. However, it is believed that a radius of about 0.030" is sufficient for proper electrical grounding of tubing having diameters at least up to 2".

Second annular rib 310 can have a minimum radius in order to prevent cutting or tearing of the conductive layer 206. It is believed that any cross-sectional radius greater than 0.005" is sufficient to prevent or substantially minimize cutting or tearing of the conductive layer 206.

Bushing 304 can include one or more through-holes 313a, 313b passing through bushing 304 at the location of (e.g., centered on) the second annular rib 310. Through-holes 313 prevent or relieve bunching of the conductive layer 206 and the first resin layer 204 when the bushing 304 is applied to the tubing 200.

Although some tearing of the conductive layer 206 may occur at the location of through-holes 313 when the bushing 304 is applied, it is not believed that this tearing impairs electrical continuity between the conductive layer 206 and the bushing 304.

Bushing 304 can also include a third annular rib 312 adapted and configured to press against an outer jacket 208 to prevent outer jacket 208 from withdrawing from the fitting 300 and to prevent foreign objects or substances from entering fitting 300. Like second annular rib 310, third annular rib 312 can be positioned with respect to the first annular rib 308 such that the third annular rib 312 presses the jacket 208 and any jacket layers below into a corrugation groove 106.

Third annular rib 312 can preferably be located approximately one corrugation width from second annular rib 310, but may also be located between about 0 and about 1 corrugation width or between about 1 and about 2 corrugation widths from rib 310.

Referring again to FIG. 3A, bushing 304 can, in some embodiments, be a split bushing. For example, bushing 306 can include two halves connected by a living hinge. A living hinge allows the bushing to open to allow ribs 314a, 314b to slide over one or more corrugation peaks 104 before resting in a corrugation groove 106 and allowing the bushing 304 to return to a substantially circular profile for engagement with body member 302. In other embodiments, the bushing 304 is a two-piece split bushing such that each half of the split bushing is individually positioned on the tubing prior to insertion into the sleeve portion 316 of the body member 302.

Referring now to FIG. 3D, the fitting 300 described herein can be used in conjunction with unjacketed tubing 200b. In such a use, second annular rib 310 and third annular rib 312 are passive and do not substantially engage with tubing 200b.

Figure 5A:
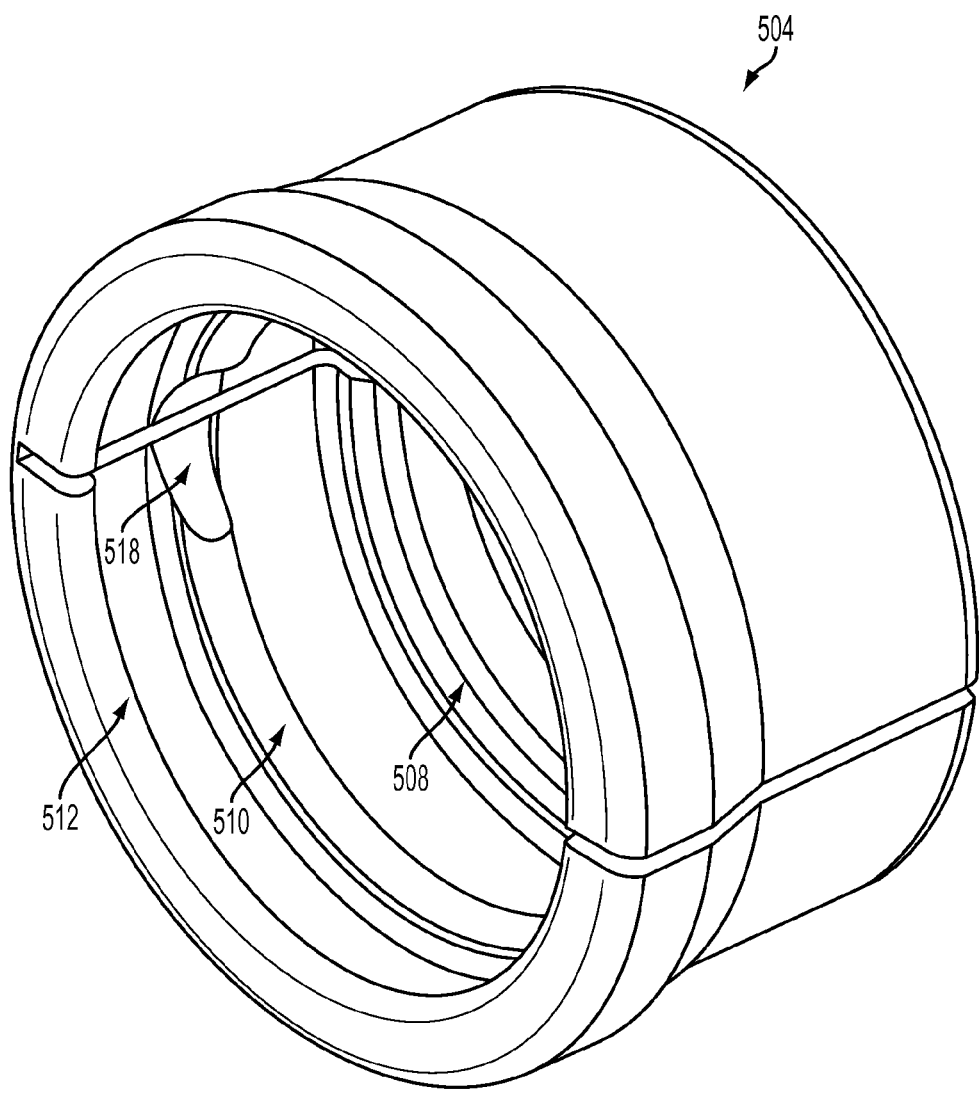
FIGS. 5A and 5B depict embodiments of a bushing with a scallop removed from one or more of the annular ribs.
Figure 5B:
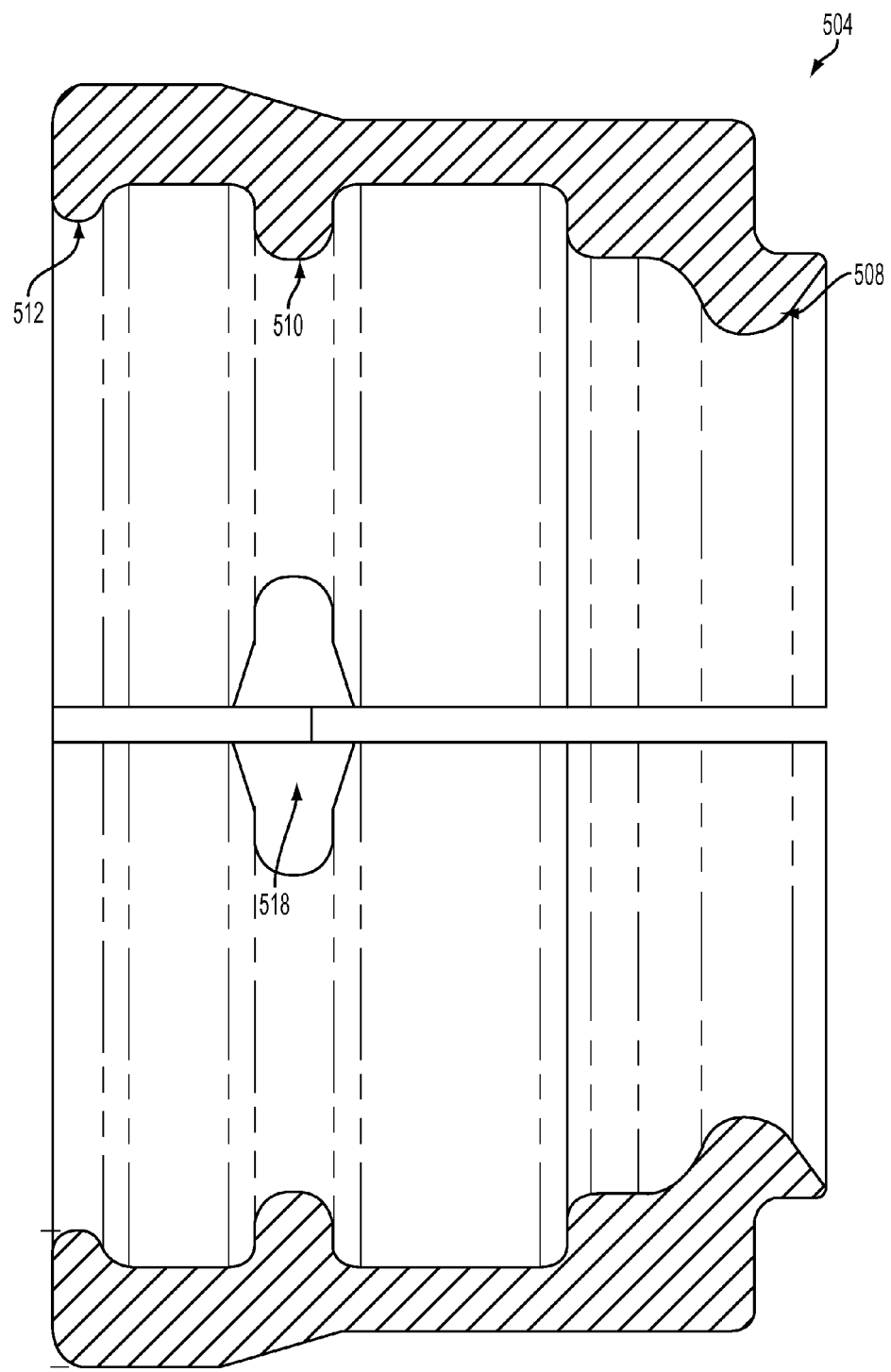

Referring now to FIGS. 5A and 5B, another embodiment of the invention provides a bushing 504 that replaces through-holes 313a, 313b in fitting 300 with a scallop(s) 518 removed from one or more of the annular ribs 508, 510, 512 (e.g., second annular rib 510 as depicted in FIGS. 5A and 5B). Scallops can eliminate bunching of jacket layers 204, 206, and/or 208, thereby reducing installation effort.

Figure 6A:
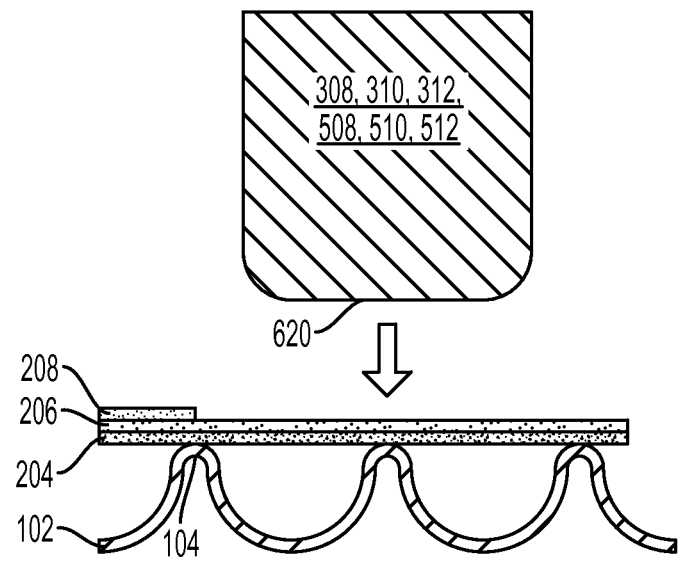
FIGS. 6A and 6B depict embodiments of internal ribs including a substantially flat surface adapted and configured to press against jacket layers positioned over a corrugation peak of corrugated tubing.
Figure 6B:
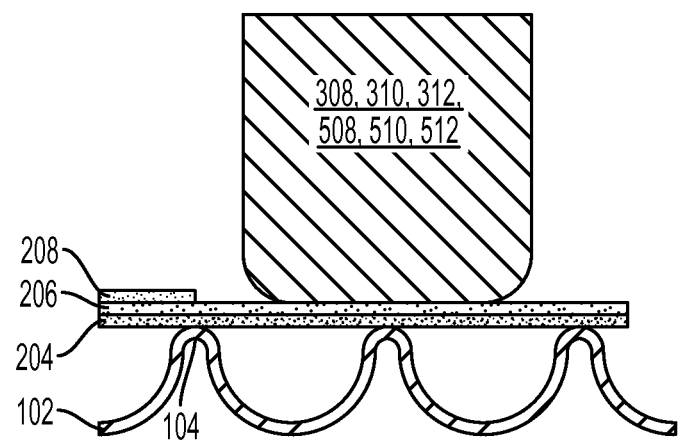

Referring now to FIGS. 6A and 6B, the internal ribs 308, 310, 312, 508, 510, 512 described herein can include a substantially flat surface 620 adapted and configured to press against any jacket layers 204, 206, 208 positioned over a corrugation peak of corrugated tubing 102. Such a configuration can provide additional surface area for conductive bonding between metal layer 206 and internal ribs 310, 510 and can also retain one or more jacket layers 204, 206, 208.

Figure 7A:
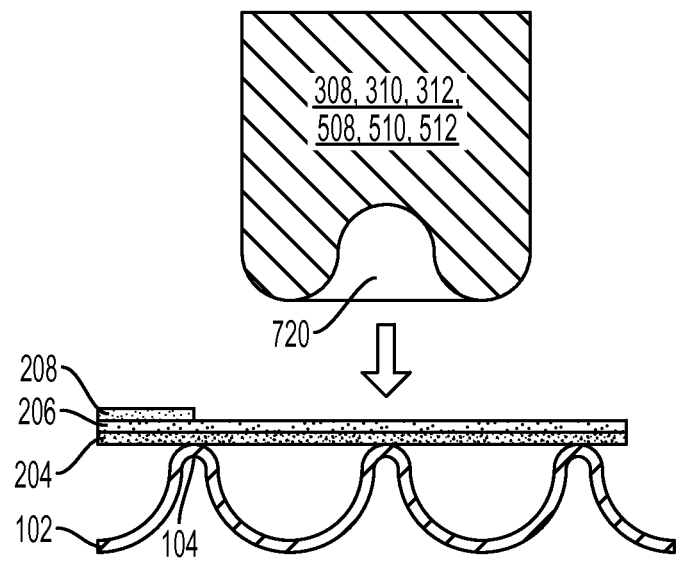
FIGS. 7A and 7B depict embodiments of internal ribs including a trough or valley adapted and configured to straddle a corrugation peak of corrugated tubing.
Figure 7B:
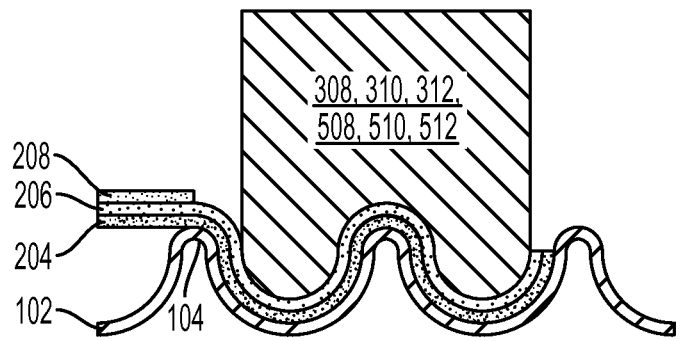

Referring now to FIGS. 7A and 7B, the internal ribs 308, 310, 312, 508, 510, 512 described herein can include a trough or valley 722 adapted and configured to straddle a corrugation peak 104 of corrugated tubing 102. Such a configuration can provide additional surface area for conductive bonding between metal layer 206 and internal ribs 310, 510 and can also retain one or more jacket layers 204, 206, 208.

Methods of Installing Tubing

Figure 4:
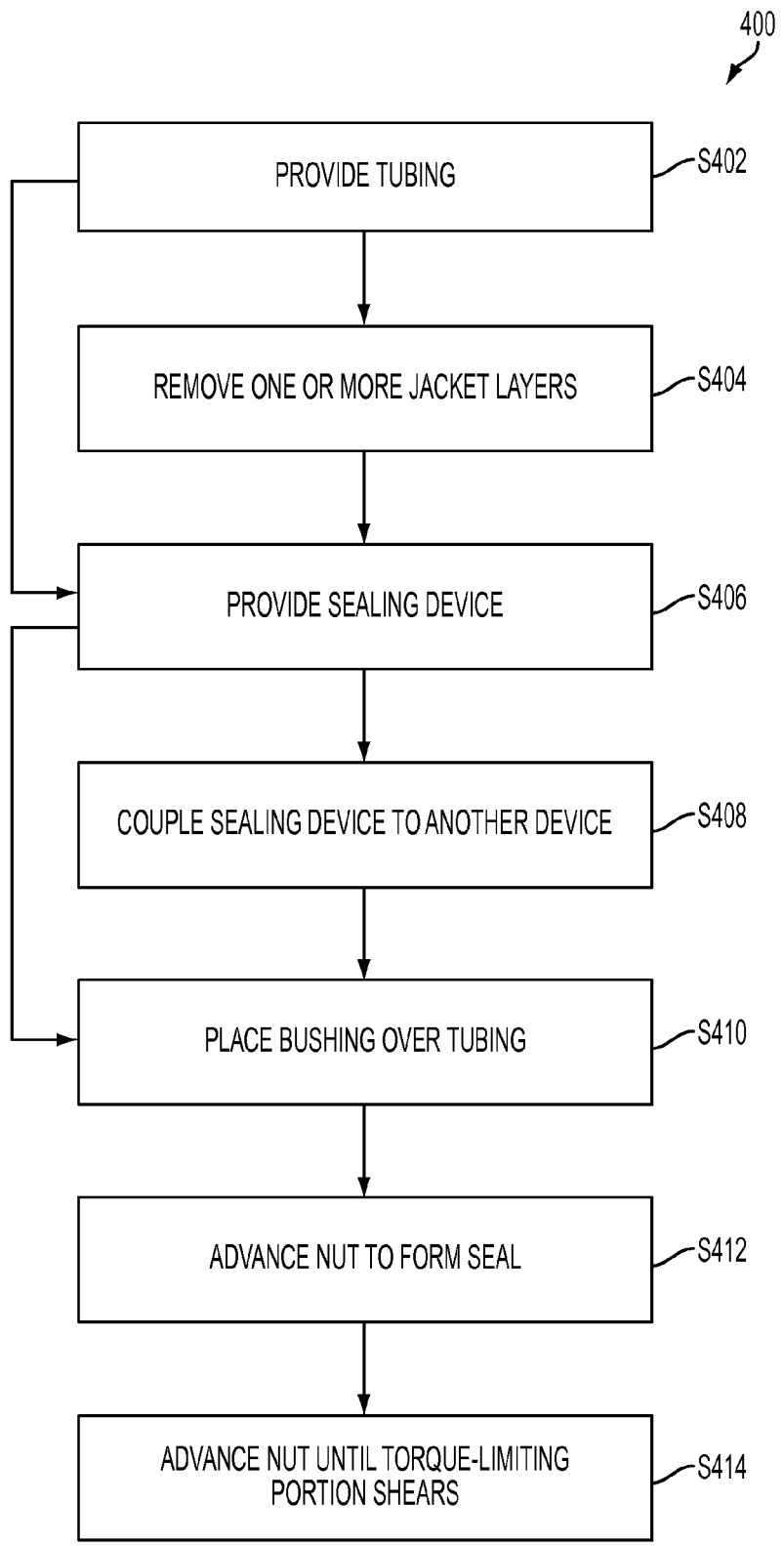
FIG. 4 depicts a method for installing energy dissipative tubing in accordance with preferred embodiments of the invention.

Tubing can be installed in accordance with existing techniques for the manufacture of CSST. An exemplary method 400 for installing energy dissipative tubing is depicted in FIG. 4.

In step S402, a length of tubing is provided. Tubing can, in some embodiments, be CSST such as unjacketed CSST, jacketed CSST, and energy-dissipative tubing. Tubing may be provided in lengths (e.g., 8 sticks) or on reels.

In step S404, one or more jacket layers are optionally removed in accordance with the instructions for a fitting. The one or more layers can be removed with existing tools such as a utility knife, a razor blade, a tubing cutter, a jacket-stripping tool, and the like. Preferably, all jacket layers are removed from a leading end of the tubing. For example, all jacket layers can be removed to expose at least the first two corrugation peaks. Additionally, one or more outer jacket layers can be further removed to expose the conductive layer in a region corresponding to the second annular rib.

In step S406, a sealing device is provided including a body member defining a sleeve portion and a bushing as described herein.

In step S408, the sealing device is optionally coupled to another device. For example, the sealing device can be coupled to a source of a fuel gas such as a pipe, a manifold, a meter, a gas main, a tank, and the like. In another example, the sealing device can be coupled to an appliance that consumes a fuel gas such as a stove, an oven, a grill, a furnace, a clothes dryer, a fire place, a generator, and the like. The sealing device can be coupled to the other device by threaded or other attachments. In some circumstances, pipe seal tape (e.g., polytetrafluoroethylene tape) or pipe seal compound (commonly referred to as "pipe dope") is utilized to facilitate a gastight seal between the sealing device and the other device.

In step S410, the bushing is placed over the inner tubing layer. The bushing can be positioned such that the first annular rib engages with a first complete corrugation groove, the second annular rib engages with a conductive layer, and a third annular rib engages with an outer jacket layer.

In step S412, a nut is advanced to form a seal. The nut can be advanced by rotating the nut to engage threads in the sleeve portion of the body member.

In step S414, the nut is optionally tightened until a torque-limiting portion of the nut is activated. For example, a portion of the nut may shear off when a predetermined amount of torque is applied to the nut.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

The invention claimed is:

1. A bushing comprising:
   a tapered outer profile having a proximal end having a smaller outer diameter than a distal end;
   a first annular internal rib:
      positioned proximal to the proximal end; and
      adapted and configured to engage a corrugation valley of corrugated tubing;
   a second annular internal rib:
      positioned distally relative to the first annular internal rib with respect to the proximal end;
      having a larger internal diameter than the first annular internal rib;
      adapted and configured to press against a conductive layer surrounding the corrugated tubing; and
      having a rounded, substantially non-piercing profile; and
   a third annular internal rib:
      positioned distally relative to the first annular internal rib and the second annular internal rib with respect to the proximal end;
      having a larger internal diameter than the second annular internal rib; and
      adapted and configured to press against an external jacket surrounding the conductive layer.

2. The bushing of claim 1, wherein the second annular internal rib is spaced along the bushing such that the second annular internal rib aligns with a second corrugation valley of the corrugated tubing.

3. The bushing of claim 1, wherein the third annular internal rib is spaced along the bushing such that the third annular internal rib aligns with a third corrugation valley of the corrugated tubing.

4. The bushing of claim 1, wherein the bushing is a split bushing.

5. The bushing of claim 1, wherein the bushing is a two-piece bushing.

6. The bushing of claim 1, wherein the bushing includes two halves coupled by a living hinge.

7. The bushing of claim 1, wherein the bushing is fabricated from a conductive material.

8. The bushing of claim 7, wherein the conductive material is a metal.

9. The bushing of claim 8, wherein the metal is selected from the group consisting of: aluminum, copper, gold, iron, silver, zinc, and an alloy thereof.

10. The bushing of claim 9, wherein the alloy is selected from the group consisting of: brass, bronze, steel, and stainless steel.

11. A sealing device for connecting a length of tubing, the sealing device comprising:
    a body member defining a sleeve portion terminating in a sealing face having a smaller internal diameter than the sleeve portion; and
    a bushing adapted and configured to be received in the sleeve portion, the bushing comprising:
       a first annular internal rib:
          positioned proximal to the sealing face of the body member; and
          adapted and configured to engage a corrugation valley of the corrugated tubing;
       a second annular internal rib:
          positioned distally relative to the first annular internal rib with respect to the sealing face;
          having a larger internal diameter than the first annular internal rib; and
          adapted and configured to press against a conductive layer surrounding the corrugated tubing; and
          having a rounded, substantially non-piercing profile; and
       a third annular internal rib:
          positioned distally relative to the first annular internal rib and the second annular internal rib with respect to the sealing face;
          having a larger internal diameter than the second annular internal rib; and
          adapted and configured to press against an external jacket surrounding the conductive layer.

12. The sealing device of claim 11, further comprising:
    a nut adapted and configured for threaded coupling with the body member.

13. The sealing device of claim 12, wherein the bushing and the nut are dimensioned such that as the nut is tightened, the second annular internal rib is adapted and configured to be compressed against the conductive layer surrounding the corrugated tubing by the nut.

14. A length of tubing comprising:
    an inner corrugated tubing layer; and
    the sealing device of claim 11 engaged with the inner corrugated tubing layer.

15. The length of tubing of claim 14, wherein the inner corrugated tubing layer is corrugated stainless steel tubing.

16. A method of installing energy dissipative tubing, the method comprising:
    providing a length of tubing including an inner corrugated tubing layer;
    providing a sealing device of claim 11;
    placing the bushing over at least the inner corrugated tubing layer such that the first annular rib engages a corrugation groove; and
    inserting the bushing and at least the inner corrugated tubing layer into the sleeve portion.

17. A bushing comprising:
    a tapered outer profile having a proximal end having a smaller outer diameter than a distal end;
    a first annular internal rib:
       positioned proximal to the proximal end; and
       adapted and configured to engage a corrugation valley of corrugated tubing;
    a second annular internal rib:
       positioned distally relative to the first annular internal rib with respect to the proximal end;
       having a larger internal diameter than the first annular internal rib;
       adapted and configured to press against a conductive layer surrounding the corrugated tubing; and
       having a rounded, non-piercing profile; and
    a third annular internal rib:
       positioned distally relative to the first annular internal rib and the second annular internal rib with respect to the sealing face;
       having a larger internal diameter than the second annular internal rib; and
       adapted and configured to press against an outer jacket layer surrounding the conductive layer;

wherein the second annular internal rib and the third internal rib are spaced along the bushing such that the second annular internal rib and the third internal rib each align with other corrugation grooves of the corrugated tubing.

18. A length of tubing comprising:
an inner corrugated tubing layer;
an internal jacket surrounding the outside of the inner corrugated tubing layer;
a conductive layer adjacent to the outside of the internal jacket;
an external jacket surrounding the conductive layer and the internal jacket; and
a sealing device comprising:
 a body member defining a sleeve portion; and
 a bushing received in the sleeve portion, the bushing comprising:
  a first annular internal rib engaged with a corrugation valley of the inner corrugated tubing layer;
  a second annular internal rib pressed against the conductive layer, wherein the second annular internal protrusion has a rounded, substantially non-piercing profile; and
  a third annular internal rib pressed against the external jacket.

* * * * *